United States Patent
Abi Aoun

(10) Patent No.: US 12,490,762 B2
(45) Date of Patent: Dec. 9, 2025

(54) AEROSOL-GENERATING MATERIAL WITH COMBUSTION RETARDING PROPERTIES AND USES THEREOF

(71) Applicant: Nicoventures Trading Limited, London (GB)

(72) Inventor: Walid Abi Aoun, London (GB)

(73) Assignee: Nicoventures Trading Limited, London (GB)

( * ) Notice: Subject to any disclaimer, the term of this patent is extended or adjusted under 35 U.S.C. 154(b) by 290 days.

(21) Appl. No.: 18/042,359

(22) PCT Filed: Aug. 20, 2021

(86) PCT No.: PCT/GB2021/052166
§ 371 (c)(1),
(2) Date: Feb. 21, 2023

(87) PCT Pub. No.: WO2022/038372
PCT Pub. Date: Feb. 24, 2022

(65) Prior Publication Data
US 2023/0346000 A1    Nov. 2, 2023

(30) Foreign Application Priority Data

Aug. 21, 2020 (GB) ...................... 2013123
Jun. 24, 2021 (GB) ...................... 2109081

(51) Int. Cl.
A24B 15/28    (2006.01)
A24B 15/12    (2006.01)
(Continued)

(52) U.S. Cl.
CPC .......... *A24B 15/287* (2013.01); *A24B 15/12* (2013.01); *A24B 15/186* (2013.01); *A24D 1/002* (2013.01); *A24D 1/20* (2020.01); *A24F 40/20* (2020.01)

(58) Field of Classification Search
None
See application file for complete search history.

(56) References Cited

U.S. PATENT DOCUMENTS 4,938,236 A    7/1990  Banerjee et al.
5,129,409 A    7/1992  White et al.
(Continued)

FOREIGN PATENT DOCUMENTS

CN    105249518 B    10/2017
CN    108024568 A    5/2018
(Continued)

OTHER PUBLICATIONS

International Search Report and Written Opinion received for PCT Patent Application No. PCT/GB2021/052166, mailed on Oct. 14, 2021, 11 pages.
(Continued)

*Primary Examiner* — Dennis R Cordray
(74) *Attorney, Agent, or Firm* — Merchant & Gould P.C.

(57) ABSTRACT

A material with combustion retarding properties including a combustion retarding salt and an aerosol-generating material, consumables including the material, and non-combustible aerosol provision systems including such consumables. Methods for manufacturing the material with combustion retarding properties and the use of a combustion retarding salt to retard combustion.

17 Claims, 1 Drawing Sheet

(51) Int. Cl.
    *A24B 15/18*     (2006.01)
    *A24D 1/00*     (2020.01)
    *A24D 1/20*     (2020.01)
    *A24F 40/20*     (2020.01)

(56)           References Cited

U.S. PATENT DOCUMENTS

| | | |
|---|---|---|
| 7,753,056 B2 | 7/2010 | Borschke et al. |
| 10,154,689 B2 | 12/2018 | Nordskog et al. |
| 2005/0066985 A1* | 3/2005 | Borschke ................ A24D 1/00 131/365 |
| 2015/0359259 A1 | 12/2015 | Conner et al. |
| 2019/0261685 A1 | 8/2019 | Sebastian et al. |
| 2020/0154785 A1 | 5/2020 | Sebastian et al. |
| 2020/0253264 A1 | 8/2020 | Rousseau et al. |

FOREIGN PATENT DOCUMENTS

| | | |
|---|---|---|
| JP | 2007507231 A | 3/2007 |
| KR | 10-2018-0044407 A | 5/2018 |
| WO | 2020/104964 A1 | 5/2020 |

OTHER PUBLICATIONS

Reasons for Refusal received for Japanese Patent Application No. 2023-509404, mailed on May 28, 2024, 4 pages.
International Preliminary Report on Patentability received for PCT Application No. PCT/GB2021/052166, mailed on Mar. 2, 2023, 7 pages.
CN Office Action in Chinese Application No. 202180055347.4, dated Oct. 23, 2024, 24 pages.

* cited by examiner ated material.

AEROSOL-GENERATING MATERIAL WITH COMBUSTION RETARDING PROPERTIES AND USES THEREOF

PRIORITY CLAIM

The present application is a National Phase entry of PCT Application No. PCT/GB2021/052166, filed Aug. 20, 2021, which claims priority from GB Application No. 2013123.1, filed Aug. 21, 2020 and GB Application No. 2109081.6, filed Jun. 24, 2021, each of which hereby fully incorporated herein by reference.

FIELD

The invention relates to a material with combustion retarding properties, wherein the material comprises an aerosol-generating material and a combustion retarding salt. It also relates to consumables comprising the material with combustion retarding properties, and non-combustible aerosol provision systems comprising such consumables. The invention further relates method for manufacturing the material with combustion retarding properties and the use of a combustion retarding salt for retarding the combustion of an aerosol-generating material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, smokeable material. The present invention relates to an aerosol-generating material with combustion retarding properties, an article comprising said material, a consumable for use in an aerosol provision system, a non-combustible aerosol provision system, and a method for producing the aerosol-generating material.

SUMMARY

According to a first aspect of the present invention, there is provided a material with combustion retarding properties comprising a combustion retarding salt and an aerosol-generating material.

In some embodiments, the combustion retarding salt is a metal halide salt, optionally selected from the group consisting of: sodium chloride, potassium chloride, sodium bromide, potassium bromide and combinations thereof.

In some embodiments, the combustion retarding salt is applied to the aerosol-generating material In some embodiments, the combustion retarding salt at least partially coats the aerosol-generating material.

In some embodiments, the aerosol-generating material comprises from about 3 wt % to about 200 wt % of the combustion retarding salt (dry weight basis).

In some embodiments, the aerosol-generating material comprises tobacco material. In some embodiments, the tobacco material is cut rag tobacco or reconstituted tobacco.

According to a second aspect of the present invention, there is provided a consumable comprising the material with combustion retarding properties according to the first aspect.

In some embodiments, the consumable is rod shaped.

According to a third aspect of the present invention, there is provided a non-combustible aerosol provision system comprising a consumable according to the second aspect.

According to a fourth aspect of the present invention, there is provided a method for manufacturing the material according to the first aspect, wherein the combustion retarding salt is incorporated into or added to the aerosol-gener- In some embodiments, a solution or suspension comprising the combustion retarding salt is applied to the aerosol-generating material.

In some embodiments, the combustion retarding salt is added during the manufacture of the aerosol-generating material.

In some embodiments, a tobacco material is mixed with a solution comprising the combustion retarding salt.

According to a fifth aspect of the present invention, there is provided use of a combustion retarding salt for retarding the combustion of an aerosol-generating material for use in a non-combustible aerosol provision system.

BRIEF DESCRIPTION OF THE DRAWINGS

Embodiments of the invention will now be described, by way of example only, with reference to accompanying drawings, in which.

DETAILED DESCRIPTION

Figure 1:
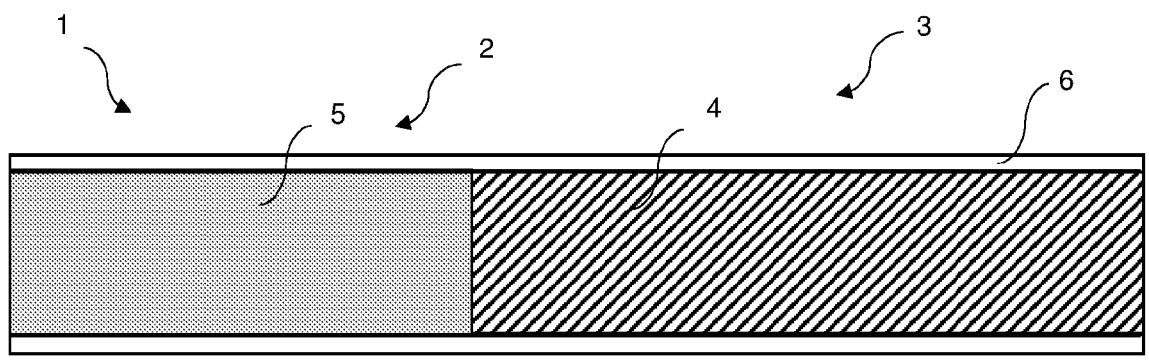
FIG. 1 is a side-on cross sectional view of a first embodiment of a consumable comprising a material with combustion retarding properties.
Figure 2:
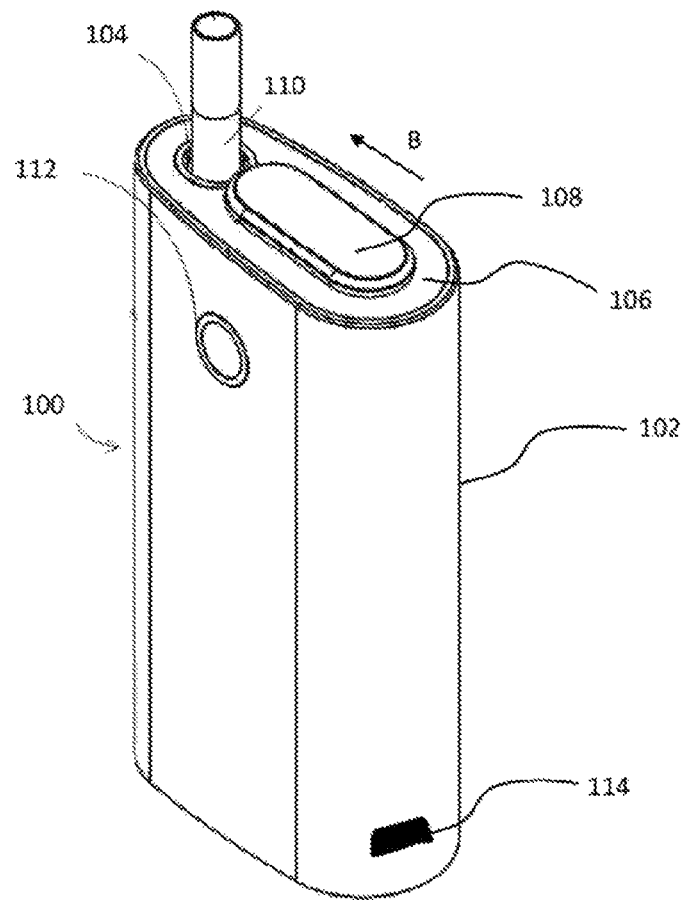
FIG. 2 is a perspective illustration of a non-combustible aerosol provision device for generating aerosol from the aerosol-generating material of the consumables of FIG. 1.

The present invention relates to an aerosol-generating material with combustion retarding properties for use in a non-combustible aerosol provision system, for example by incorporation into a consumable. The combustion retarding properties are afforded by adding at least one combustion retarding salt to the aerosol-generating material.

The invention enjoys the advantage of an aerosol-generating material that is capable of withstanding higher temperatures without burning, which in turn can allow for the release of more volatiles. This is desirable for the end user of the non-combustible aerosol provision system. Additionally, this invention reduces the need for combustion retarding wrapper(s) or inner wrappers, such as an aluminium foil inner wrapper, that may otherwise be necessary to incorporated into the non-combustible aerosol provision system.

The inventors have advantageously found a material with combustion retarding properties can be provided by adding a combustion retarding salt to an aerosol-generating material.

In some embodiments, the material comprises a combustion retarding salt in an amount of at least about 3 wt %, 3.5 wt %, 4 wt %, 4.5 wt %, 5 wt %, 5.5 wt %, 6 wt %, 6.5 wt %, 7 wt %, 7.5 wt %, 8 wt %, 9 wt %, 10 wt %, 20 wt %, 30 wt %, 40 wt %, 50 wt %, 60 wt %, 70 wt %, 80 wt %, 90 wt %, 100 wt %, and/or in an amount of no more than about 200 wt %, 180 wt %, 160 wt %, 140 wt %, 120 wt %, 100 wt %, 80 wt %, 70 wt %, 60 wt % or 50 wt % of the aerosol-generating material (i.e. based on the weight of the aerosol-generating material before the salt is added) (all calculated on a dry weight basis).

In some embodiments, the aerosol-generating material comprises a combustion retarding salt in an amount of about 5 wt % to about 200 wt % based upon the weight of the aerosol-generating material prior to addition of the salt. Alternatively, the amount of combustion retarding salt included is from about 10 wt % to about 50 wt %.

For the avoidance of doubt, the reference to the amount of salt in the treated aerosol-generating material is a reference to the amount of added salt, and does not include any salt that may be present in the aerosol-generating material before the addition of the combustion retarding salt as described herein.

In some embodiments, the combustion retarding salt is incorporated into the aerosol-generating material. This means that the combustion retarding salt is included within the aerosol-generating composition. For example, the combustion retarding salt is added during the preparation of the aerosol-generating material. This can lead to the combustion retarding salt being distributed throughout the resultant aerosol-generating material. In some embodiments, the distribution of the combustion retarding salt is even throughout the aerosol-generating material and this may be advantageous as the combustion retarding effect is effective across the all of the material. The combustion retarding salt may be added in the form of a solution or suspension. Alternatively, the combustion retarding salt may be in solid form, for example in particulate form, such as a powder.

In other embodiments, the combustion retarding salt is added or applied to the aerosol-generating material. For example, a solution or suspension comprising the combustion retarding salt is applied to the surface of the aerosol-generating material, to deposit the combustion retarding salt on the surface of the aerosol-generating material.

In some embodiments, the aerosol-generating material is contacted with a solution or a suspension comprising the combustion retarding salt. This technique may be used to form a coating of salt on the surface of the aerosol-generating material. This technique may be repeated multiple times to form one or more layers of the combustion retarding salt. In some embodiments, different combustion retarding salts may be incorporated in the one or more coatings and/or in the aerosol-generating material. This may provide a specific combustion-retarding profile.

In some embodiments, a solution or suspension of the combustion retarding salt may be sprayed directly onto the aerosol-generating material. This is advantageous because the layer of the inorganic solid may be evenly distributed over the aerosol-generating material. This process may also be repeated to provide a desired thickness of the layer of combustion retarding salt, which is a further advantage. The layers of the combustion retarding salt may comprise the same salt or different salts. Additionally, the proportion of the combustion retarding salt in the carrier liquid or solvent may be altered to provide a layer on the aerosol-generating material with desired properties. In such embodiments, the proportion of the combustion retarding salt in the solvent or carrier liquid may comprise from about 1 wt %, 5 wt %, 10 wt %, 15 wt %, 20 wt % or 25 wt % to about 40 wt %, 38 wt %, 35 wt % or 30 wt % of the combustion retarding salt (all calculated on a dry weight basis).

In embodiments of the invention in which the combustion retarding salt is a coating on the aerosol-generating material, the coating layer may have a thickness of from about 0.2 μM to about 10 μm. The coating layer may have a thickness of about 1 μm, about 2 μm, about 3 μm, about 4 μm, or about 5 μm. The combustion retarding salt coating may comprise more than one layer, and the thickness described herein refers to the aggregate thickness of those layers. The coating may also contain other additives in addition to the combustion retarding salt(s) as disclosed herein. The coating may also be very thin, and inconsistent across the surface of the aerosol-generating material.

The thickness of the coating of combustion retarding salt may be measured using a microscope such as a scanning electron microscope (SEM), as known to those skilled in the art, or any other suitable technique known to those skilled in the art.

In some cases, the combustion retarding salt coating thickness may vary by no more than 25%, 20%, 15%, 10%, 5% or 1% across its area.

In some embodiments, all of the aerosol-generating material comprises the combustion retarding salt.

As described herein, the rod of aerosol-generating material may have a first and a second end. In use, the rod has a downstream end, usually connected to or comprising a mouthpiece and/or filter, and an upstream end, also referred to as a distal end.

In some embodiments, the material with combustion retarding properties is provided locally, for example, at the distal end of a rod of aerosol-generating material, with little or no material with combustion retarding properties provided in other parts of the consumable. In some of these embodiments, only a portion of the total aerosol-generating material comprises the combustion retarding salt. In some embodiments in which a consumable comprises the material with combustion retarding properties (described herein), a portion of the aerosol-generating material towards or at the distal end of the consumable may comprise the combustion retarding salt. This embodiment enjoys the advantage of preventing the aerosol-generating material combusting if an attempt is made to light the consumable like a cigarette.

In some embodiments, the material with combustion retarding properties is provided in greater concentration at a location proximal to the distal end. In some embodiments, the material with combustion retarding properties is provided exclusively at a location proximal to the distal end. The area in which the material with combustion retarding properties is provided may be at most about 5%, at most about 10%, at most about 20%, at most about 30%, at most about 40%, at most about 50%, or at most about 60% of the rod from the distal end.

In some embodiments, the combustion retarding salt may be added to the distal end of a rod of the aerosol-generating material via injection or any suitable method. For example, a solution or suspension comprising the combustion retarding salt may be injected into, sprayed onto or otherwise locally added to the rod of aerosol-generating material. The portion of the aerosol-generating material comprising the combustion retarding salt may be between about 3 to about 15%, or between about 3 to about 8%, or between about 8 to about 12%, by weight of the total aerosol-generating material. The portion of the aerosol-generating material comprising the combustion retarding salt may cover about 3 to about 8 mm, or about 4 to about 6 mm of the length of the consumable from the distal end.

Combustion Retarding Salt

The salt used herein is a chemical compound consisting of an ionic assembly of cation and anions. The salts used herein are those whose anion and/or whose cation may be effective in retarding combustion. In some embodiments, the salt is an inorganic salt.

In some embodiments, the salt is a halide salt, i.e. has a halide anion. In some embodiments, the salt is a chloride salt or a bromide salt. The presence of high concentrations of chloride or bromide has been shown to retard combustion, as discussed further below.

In some embodiments, the salt may be an alkali metal salt, i.e. has an alkali metal cation. In some embodiments, the salt has an alkaline earth metal cation. In some embodiments, the salt has a zinc cation or an iron cation, such as a ferric or ferrous cation. In some embodiments, the salt has an ammonium cation or a phosphonium cation.

In some embodiments, the salt may be an alkali metal halide, such as sodium chloride or potassium chloride. The salt may be an alkaline earth metal halide, such as magnesium chloride, calcium chloride. The salt may be another metal halide, such as zinc chloride or sodium bromide.

In some embodiments, the salt has a carboxylate anion. For example, the salt may be an alkali metal carboxylate, such as potassium citrate, potassium succinate, potassium malate, potassium acetate, potassium tartrate, potassium oxalate, sodium citrate, sodium succinate, sodium acetate, or sodium malate.

In other embodiments, the salt has an anion selected from: borate, carbonate, phosphate, sulphate or sulphamate.

Factors that may influence the selection of salt will include, for example, melting point, which will preferably be at least 450° C. In some embodiments, the salt is soluble in water. In some embodiments, the salt is selected to provide a desired pH to the material it is added to. In some embodiments, the salt will not significantly change the pH of the material In some embodiments, sodium chloride (NaCl) is the salt used. It has been demonstrated that amorphous solid material with a high chloride content is difficult to combust. Further, sodium chloride is neutral, highly soluble and does not affect pH of the amorphous solid material.

The combustion retarding salt may be one salt or a combination of any number of salts disclosed herein or known in the art, and is referred to as "combustion retarding salt" herein. The combustion retarding salt(s) may be advantageously selected to give the material the desired combustion retarding properties.

In some embodiments, the combustion retarding salt selected may have one or more advantageous properties, such as: inertness, solubility in a precursor liquid, solubility or distribution in the amorphous solid or precursor material to the amorphous solid, density or other properties known in the art.

In some embodiments, the combustion retarding salt comprises, consists essentially of, or consists of sodium chloride, potassium chloride, sodium bromide and/or potassium bromide.

Depending on the combustion retarding or other physical properties desired, the components of the salt may be in free base form, salt form, or as a complex, or as a solvate. The combustion retarding salt may be of any density and any crystalline structure.

The Liquid Carrier

In some embodiments, the combustion retarding salt is incorporated into or added to the aerosol-generating material dissolved in a solvent or liquid carrier. In some embodiments, the combustion retarding salt is suspended in a liquid carrier. The solvent or liquid carrier may be an aqueous or organic liquid, and may be polar or non-polar depending on its suitable application.

The liquid carrier may be selected to be readily removed to leave the combustion retarding salt in or on the aerosol-generating material.

Aerosol-Generating Material

Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid.

The aerosol-generating material may comprise one or more active substances and/or flavors, one or more aerosol-former materials, and optionally one or more other functional material.

The aerosol-generating material referred to herein may comprise one or more different aerosol-generating materials.

In some embodiments, the aerosol-generating material may comprise an active substance. In some embodiments, the aerosol-generating material does not comprise an active substance.

The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, *cannabis* or another botanical.

In some embodiments, the active substance comprises nicotine. In some embodiments, the active substance comprises caffeine, melatonin or vitamin B12.

As noted herein, the active substance may comprise one or more constituents, derivatives or extracts of *cannabis*, such as one or more cannabinoids or terpenes.

As noted herein, the active substance may comprise or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, *eucalyptus*, star anise, hemp, cocoa, *cannabis*, fennel, lemongrass, peppermint, spearmint, rooibos, chamomile, flax, ginger, *Ginkgo biloba*, hazel, hibiscus, laurel, licorice (liquorice), matcha, mate, orange skin, *papaya*, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, *curcuma*, turmeric, sandalwood, cilantro, bergamot, orange blossom, myrtle, cassis, valerian, pimento, mace, damien, marjoram, olive, lemon balm, lemon basil, chive, *carvi, verbena*, tarragon, geranium, mulberry, *ginseng*, theanine, theacrine, maca, ashwagandha, damiana, guarana, chlorophyll, baobab or any combination thereof. The mint may be chosen from the following mint varieties: *Mentha arventis, Mentha* c.v., *Mentha niliaca, Mentha piperita,*

*Mentha piperita citrata* c.v., *Mentha piperita* c.v., *Mentha spicata crispa, Mentha* cardifolia, *Mentha* longifolia, *Mentha suaveolens variegata, Mentha pulegium, Mentha spicata* c.v. and *Mentha suaveolens*

In some embodiments, the active substance comprises or is derived from one or more botanicals or constituents, derivatives or extracts thereof and the botanical is tobacco.

In some embodiments, the active substance comprises or derived from one or more botanicals or constituents, derivatives or extracts thereof and the botanical is selected from *eucalyptus*, star anise, cocoa and hemp.

In some embodiments, the active substance comprises or derived from one or more botanicals or constituents, derivatives or extracts thereof and the botanical is selected from rooibos and fennel.

The aerosol-generating material described herein can contain an aerosol modifying agent, such as any of the flavors described herein.

The aerosol-generating material may comprise a flavor and may comprise up to about 80 wt %, 70 wt %, 60 wt %, 55 wt %, 50 wt % or 45 wt % of a flavor.

In some cases, the aerosol-generating material may comprise at least about 0.1 wt %, 1 wt %, to wt %, 20 wt %, 30 wt %, 35 wt % or 40 wt % of a flavor (all calculated on a dry weight basis).

For example, the aerosol-generating material may comprise 1-80 wt %, 10-80 wt %, 20-70 wt %, 30-60 wt %, 35-55 wt % or 30-45 wt % of a flavor. In some cases, the flavor comprises, consists essentially of or consists of menthol.

In some embodiments, the flavorant is located in the aerosol-generating material. The aerosol-generating material therefore has the advantage of preventing the combustion of the flavorant and prevention of a displeasing taste to the end user.

As used herein, the terms "flavor" and "flavorant" refer to materials which, where local regulations permit, may be used to create a desired taste, aroma or other somatosensorial sensation in a product for adult consumers. They may include naturally occurring flavor materials, botanicals, extracts of botanicals, synthetically obtained materials, or combinations thereof (e.g., tobacco, *cannabis*, licorice (liquorice), *hydrangea*, eugenol, Japanese white bark *magnolia* leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, *papaya*, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, *betel*, shisha, pine, honey essence, rose oil, vanilla, lemon oil, orange oil, orange blossom, cherry blossom, *cassia*, caraway, cognac, jasmine, ylang-ylang, sage, fennel, wasabi, piment, ginger, coriander, coffee, hemp, a mint oil from any species of the genus *Mentha, eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, *curcuma*, cilantro, myrtle, cassis, valerian, pimento, mace, damien, marjoram, olive, lemon balm, lemon basil, chive, *carvi, verbena*, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

In some embodiments, the flavor comprises menthol, spearmint and/or peppermint. In some embodiments, the flavor comprises flavor components of cucumber, blueberry, citrus fruits and/or redberry. In some embodiments, the flavor comprises eugenol. In some embodiments, the flavor comprises flavor components extracted from tobacco. In some embodiments, the flavor comprises flavor components extracted from *cannabis*.

In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

In some cases, the total content of active substance and/or flavor may be at least about 0.1 wt %, 1 wt %, 5 wt %, 10 wt %, 20 wt %, 25 wt % or 30 wt %. In some cases, the total content of active substance and/or flavor may be less than about 90 wt %, 80 wt %, 70 wt %, 60 wt %, 50 wt % or 40 wt % (all calculated on a dry weight basis).

In some embodiments, the aerosol-generating material comprises plant material, such as tobacco material and/or nicotine. In some cases, the aerosol-generating material may comprise 5-60 wt % (calculated on a dry weight basis) of a tobacco material and/or nicotine and/or tobacco extract. In some cases, the aerosol-generating material may comprise from about 1 wt %, 5 wt %, 10 wt %, 15 wt %, 20 wt % or 25 wt % to about 70 wt %, 60 wt %, 50 wt %, 45 wt %, 40 wt %, 35 wt %, or 30 wt % (calculated on a dry weight basis) of a plant material and/or tobacco material and/or nicotine and/or tobacco extract. In a preferred embodiment of the invention, the aerosol-generating material may comprise 5-60 wt % (calculated on a dry weight basis) of a plant material and/or tobacco material and/or nicotine and/or tobacco extract.

In some cases, the total content of plant and/or tobacco material, nicotine and flavor may be at least about 0.1 wt %, 1 wt %, 5 wt %, 10 wt %, 20 wt %, 25 wt % or 30 wt %. In some cases, the total content of active substance and/or flavor may be less than about 90 wt %, 80 wt %, 70 wt %, 60 wt %, 50 wt % or 40 wt % (all calculated on a dry weight basis).

In some embodiments, the aerosol-generating material comprises plant material, such as tobacco material. As used herein, the term "tobacco material" refers to any material comprising tobacco or derivatives or substitutes thereof. The term "tobacco material" may include one or more of tobacco, tobacco derivatives, expanded tobacco, reconstituted tobacco or tobacco substitutes. The tobacco material may comprise one or more of ground tobacco, tobacco fiber, cut tobacco, extruded tobacco, tobacco stem, tobacco lamina, reconstituted tobacco and/or tobacco extract.

In some embodiments, the plant material used is tobacco material and may be any type of tobacco and any part of the tobacco plant, including tobacco lamina, stem, stalk, ribs, scraps and shorts or mixtures of two or more thereof. Suitable tobacco materials include the following types: dark tobacco, light tobacco, Rajangan tobacco, Virginia or flue-cured tobacco, Burley tobacco, Oriental tobacco, or blends of tobacco materials, optionally including those listed here. Some of these tobacco varieties, may be processed differently, as known to the skilled person.

The tobacco may be expanded, such as dry-ice expanded tobacco (DIET), or processed by any other means. In some embodiments, the tobacco material may be reconstituted tobacco material. The tobacco may be pre-processed or unprocessed, and may be, for instance, solid stems (SS); shredded dried stems (SDS); steam treated stems (STS); or any combination thereof. The tobacco material may be fermented, cured, uncured, toasted, or otherwise pre-treated. The treatments listed herein or known in the art may be performed on the tobacco material before or after application of the combustion retarding salt material.

In a preferred embodiments the tobacco material is unprocessed or processed tobacco raw tobacco material, commonly known in the art as "flax". The flax may be of any size, thickness and weight.

In some embodiments, the tobacco material is in the form of reconstituted tobacco that has been processed or is then processed and cut to form a cut rag tobacco.

In some embodiments, the tobacco material is in the form of tobacco particles. In some embodiments, the tobacco material is in the form of tobacco strips.

The tobacco material may be provided in the form of cut rag tobacco. The cut rag tobacco can have a cut width of at least 15 cuts per inch (about 5.9 cuts per cm, equivalent to a cut width of about 1.7 mm). Preferably, the cut rag tobacco has a cut width of at least 18 cuts per inch (about 7.1 cuts per cm, equivalent to a cut width of about 1.4 mm), more preferably at least 20 cuts per inch (about 7.9 cuts per cm, equivalent to a cut width of about 1.27 mm).

In one example, the cut rag tobacco has a cut width of 22 cuts per inch (about 8.7 cuts per cm, equivalent to a cut width of about 1.15 mm). Preferably, the cut rag tobacco has a cut width at or below 40 cuts per inch (about 15.7 cuts per cm, equivalent to a cut width of about 0.64 mm). Cut widths between 0.5 mm and 2.0 mm, for instance between 0.6 and 1.7 mm or between 0.6 mm and 1.5 mm, have been found to result in tobacco material which is preferably in terms of surface area to volume ratio, particularly when heated, and the overall density and pressure drop of the rod of aerosol-generating material.

The cut rag tobacco can be formed from a mixture of forms of tobacco material, for instance a mixture of one or more of paper reconstituted tobacco, leaf tobacco, extruded tobacco and bandcast tobacco. Preferably the tobacco material comprises paper reconstituted tobacco or a mixture of paper reconstituted tobacco and leaf tobacco.

Paper reconstituted tobacco may be present in the tobacco component of the tobacco material described herein in an amount of from 10% to 100% by weight of the tobacco component. In embodiments, the paper reconstituted tobacco is present in an amount of from 10% to 80% by weight, or 20% to 70% by weight, of the tobacco component. In a further embodiment, the tobacco component consists essentially of, or consists of, paper reconstituted tobacco. In preferred embodiments, leaf tobacco is present in the tobacco component of the tobacco material in an amount of from at least 10% by weight of the tobacco component. For instance, leaf tobacco can be present in an amount of at least 10% by weight of the tobacco component, while the remainder of the tobacco component comprises paper reconstituted tobacco, bandcast reconstituted tobacco, or a combination of bandcast reconstituted tobacco and another form of tobacco such as tobacco granules. Suitably, leaf tobacco can be present in an amount up to 40% or 60% of the tobacco material, while the remainder of the tobacco component comprises paper reconstituted tobacco, bandcast reconstituted tobacco, or a combination of bandcast reconstituted tobacco and another form of tobacco such as tobacco granules.

Paper reconstituted tobacco refers to tobacco material formed by a process in which tobacco feedstock is extracted with a solvent to afford an extract of solubles and a residue comprising fibrous material, and then the extract (usually after concentration, and optionally after further processing) is recombined with fibrous material from the residue (usually after refining of the fibrous material, and optionally with the addition of a portion of non-tobacco fibers) by deposition of the extract onto the fibrous material. The process of recombination resembles the process for making paper.

The paper reconstituted tobacco may be any type of paper reconstituted tobacco that is known in the art. In a particular embodiment, the paper reconstituted tobacco is made from a feedstock comprising one or more of tobacco strips, tobacco stems, and whole leaf tobacco. In a further embodiment, the paper reconstituted tobacco is made from a feedstock consisting of tobacco strips and/or whole leaf tobacco, and tobacco stems. However, in other embodiments, scraps, fines and winnowings can alternatively or additionally be employed in the feedstock.

The paper reconstituted tobacco for use in the tobacco material described herein may be prepared by methods which are known to those skilled in the art for preparing paper reconstituted tobacco.

The density of the tobacco material has an impact on the speed at which heat conducts through the material, with lower densities, for instance those below 700 mg/cc, conducting heat more slowly through the material, and therefore enabling a more sustained release of aerosol.

The plant material, such as tobacco material, may have any suitable thickness. The plant material, such as tobacco material, may have a thickness of at least about 0.145 mm, for instance at least about 0.15 mm, or at least about 0.16 mm. The plant material may have a maximum thickness of about 0.25 mm, for instance the thickness of the tobacco material may be less than about 0.22 mm, or less than about 0.2 mm. In some embodiments, the tobacco material may have an average thickness in the range 0.175 mm to 0.195 mm. Such thicknesses may be particularly suitable where the plant material is a reconstituted tobacco material.

The tobacco material can comprise reconstituted tobacco material having a density of less than about 700 mg/cc, for instance paper reconstituted tobacco material. For instance, the aerosol-generating material comprises reconstituted tobacco material having a density of less than about 600 mg/cc. Alternatively or in addition, the aerosol-generating material can comprise reconstituted tobacco material having a density of at least 350 mg/cc.

The tobacco material described herein contains nicotine. The nicotine content is from 0.5 to 1.75% by weight of the tobacco material, and may be, for example, from 0.8 to 1.5% by weight of the tobacco material. Additionally or alternatively, the tobacco material contains between 10% and 90% by weight tobacco leaf having a nicotine content of greater than 1.5% by weight of the tobacco leaf. It has been advantageously found that using a tobacco leaf with nicotine content higher than 1.5% in combination with a lower nicotine base material, such as paper reconstituted tobacco, provides a tobacco material with an appropriate nicotine level but better sensory performance than the use of paper reconstituted tobacco alone. The tobacco leaf, for instance cut rag tobacco, can, for instance, have a nicotine content of between 1.5% and 5% by weight of the tobacco leaf.

In an embodiment, the aerosol-generating material comprises the tobacco component as defined herein, the aerosol-former material as defined herein, and a combustion retarding salt as defined herein. In an embodiment, the aerosol-generating material consists essentially of the tobacco component as defined herein, the aerosol-former material as defined herein, and a combustion retarding salt as defined herein. In an embodiment, the tobacco material consists of the tobacco component as defined herein, the aerosol-former material as defined herein, and a combustion retarding salt as defined herein.

In one embodiment, the aerosol-generating material comprises plant material, such as tobacco material, and menthol, forming a mentholated aerosol-generating material. The plant material can comprise from 3 mg to 20 mg of menthol, preferably between 5 mg and 18 mg and more preferably between 8 mg and 16 mg of menthol in a rod of tobacco (the rod of tobacco having a total mass of approximately 340 mg). The plant material can contain between 2% and 8% by weight of menthol, preferably between 3% and 7% by weight of menthol and more preferably between 4% and 5.5% by weight of menthol. In one embodiment, the plant material includes 4.7% by weight of menthol. Such high levels of menthol loading can be achieved using a high percentage of reconstituted tobacco material, for instance greater than 50% of the tobacco material by weight. Alternatively or additionally, a higher level of menthol loading that can be achieved by incorporation of the menthol in an aerosol-generating material comprising an aerosol forming agent and one or more binder and/or cross-linker.

Other Components of the Aerosol-Generating Material

The aerosol-generating material may comprise one or more other functional materials, which may comprise one or more of pH regulators, coloring agents, preservatives, binders, fillers, stabilizers, and/or antioxidants.

In some embodiments, the aerosol-generating material contains a filler component. The filler component is generally a non-tobacco component, that is, a component that does not include ingredients originating from tobacco.

In some embodiments, the aerosol-generating material comprises less than 60 wt % of a filler, such as from 1 wt % to 60 wt %, or 5 wt % to 50 wt %, or 5 wt % to 30 wt %, or 10 wt % to 20 wt %.

In other embodiments, the aerosol-generating material comprises less than 20 wt %, suitably less than 10 wt % or less than 5 wt % of a filler. In some cases, the aerosol-generating material comprises less than 1 wt % of a filler, and in some cases, comprises no filler.

The filler, if present, may comprise one or more inorganic filler materials in addition to the combustion retarding salt(s), such as calcium carbonate, perlite, vermiculite, magnesium carbonate, and suitable inorganic sorbents, such as molecular sieves. The filler may comprise one or more organic filler materials such as wood pulp, cellulose and cellulose derivatives. In particular cases, the aerosol-generating material comprises no calcium carbonate such as chalk.

In particular embodiments which include filler, the filler is fibrous. For example, the filler may be a fibrous organic filler material such as wood pulp, hemp fiber, cellulose or cellulose derivatives. Without wishing to be bound by theory, it is believed that including fibrous filler in the aerosol-generating material may increase the tensile strength of the material.

In some embodiments, the aerosol-generating material does not comprise tobacco fibers.

In some examples, such as where the aerosol-generating material comprises a filler, aerosol-generating material may have a tensile strength of from 600 N/m to 900 N/m, or from 700 N/m to 900 N/m, or around 800 N/m. Such tensile strengths may be particularly suitable for embodiments wherein the aerosol-generating material is included in an aerosol-generating article as a rolled sheet, suitably in the form of a tube or a rod.

In some embodiments, the aerosol-generating material contains an aerosol-former material.

The aerosol-former material may comprise one or more constituents capable of forming an aerosol. In some embodiments, the aerosol-former material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

In some embodiments, the aerosol-former material included with the plant and/or tobacco material may be glycerol, propylene glycol, or a mixture of glycerol and propylene glycol. Glycerol may be present in an amount of from 10 to 20% by weight of the plant and/or tobacco material, for example 13 to 16% by weight of the composition, or about 14% or 15% by weight of the composition. Propylene glycol, if present, may be present in an amount of from 0.1 to 0.3% by weight of the composition.

The plant and/or tobacco material can contain between 10% and 90% by weight tobacco leaf, wherein the aerosol-former material is provided in an amount of up to about 10% by weight of the leaf tobacco. To achieve an overall level of aerosol-former material between 10% and 20% by weight of the plant and/or tobacco material, it has been advantageously found that this can be added in higher weight percentages to the another component of the plant and/or tobacco material, such as reconstituted tobacco material.

The aerosol-generating material may comprise a binder. In some cases, the aerosol-generating material may comprise at least about 0.1 wt %, 1 wt %, 10 wt %, 20 wt %, 30 wt %, 35 wt % or 40 wt % of a binder (all calculated on a dry weight basis).

The aerosol-generating material may comprise one or more binding additives. The binding additive helps to adhere particles of plant and/or tobacco material to each other and to other components in the aerosol-generating material. Suitable binding additives include, for example, thermoreversible gelling agents such as gelatin, starches, polysaccharides, pectins, alginates, wood pulp, celluloses, and cellulose derivatives such as carboxymethylcellulose. Inclusion of a binding additive may have the advantage that the aerosol-generating material is easier to handle and process.

In some embodiments, the aerosol-generating material comprises less than 60 wt % of a filler, such as from 1 wt % to 60 wt %, or 5 wt % to 50 wt %, or 5 wt % to 30 wt %, or 10 wt % to 20 wt %.

In other embodiments, the aerosol-generating material comprises less than 20 wt %, suitably less than 10 wt % or less than 5 wt % of a filler. In some cases, the aerosol-generating material comprises less than 1 wt % of a filler, and in some cases, comprises no filler.

The filler, if present, may comprise one or more inorganic filler materials in addition to the combustion retarding salt(s), such as calcium carbonate, perlite, vermiculite, magnesium carbonate, and suitable inorganic sorbents, such as molecular sieves. The filler may comprise one or more organic filler materials such as wood pulp, cellulose and cellulose derivatives. In particular cases, the aerosol-generating material comprises no calcium carbonate such as chalk.

In particular embodiments which include filler, the filler is fibrous. For example, the filler may be a fibrous organic filler material such as wood pulp, hemp fiber, cellulose or cellulose derivatives. Without wishing to be bound by theory, it is believed that including fibrous filler in the aerosol-generating material may increase the tensile strength of the material.

In some embodiments, the aerosol-generating material does not comprise tobacco fibers.

In some examples, such as where the aerosol-generating material comprises a filler, aerosol-generating material may have a tensile strength of from 600 N/m to 900 N/m, or from 700 N/m to 900 N/m, or around 800 N/m. Such tensile strengths may be particularly suitable for embodiments wherein the aerosol-generating material is included in an aerosol-generating article as a rolled sheet, suitably in the form of a tube or a rod.

In some embodiments, the aerosol-generating material comprises an amorphous solid material. The amorphous solid material may alternatively be referred to as a "monolithic solid" (i.e. non-fibrous). In some embodiments, the amorphous solid may be a dried gel. The amorphous solid is a solid material that may retain some fluid, such as liquid, within it.

In some embodiments, the amorphous solid material comprises one or more aerosol-former materials. Optionally, it may further comprise one or more active substances and/or flavors, and/or optionally one or more other functional materials. The one or more other functional materials may comprise one or more of pH regulators, coloring agents, preservatives, binders, fillers, stabilizers, and/or antioxidants.

Suitably, the amorphous solid material may comprise from about 1 wt %, 5 wt %, 10 wt %, 15 wt %, 20 wt % or 25 wt % to about 60 wt %, 50 wt %, 45 wt %, 40 wt % or 35 wt % of a gelling agent (all calculated on a dry weight basis). For example, the amorphous solid may comprise 1-50 wt %, 5-45 wt %, 10-40 wt % or 20-35 wt % of a gelling agent. In some embodiments, the gelling agent comprises a hydrocolloid.

In some embodiments, the gelling agent comprises one or more compounds selected from the group comprising alginates, pectins, starches (and derivatives), celluloses (and derivatives), gums, silica or silicones compounds, clays, polyvinyl alcohol and combinations thereof. For example, in some embodiments, the gelling agent comprises one or more of alginates, pectins, hydroxyethyl cellulose, hydroxypropyl cellulose, carboxymethylcellulose, pullulan, xanthan gum guar gum, carrageenan, agarose, acacia gum, fumed silica, PDMS, sodium silicate, kaolin and polyvinyl alcohol. In some cases, the gelling agent comprises alginate and/or pectin, and may be combined with a setting agent (such as a calcium source) during formation of the amorphous solid. In some cases, the amorphous solid may comprise a calcium-crosslinked alginate and/or a calcium-crosslinked pectin In some embodiments, the gelling agent comprises alginate, and the alginate is present in the amorphous solid in an amount of from 10-30 wt % of the amorphous solid (calculated on a dry weight basis). In some embodiments, alginate is the only gelling agent present in the amorphous solid. In other embodiments, the gelling agent comprises alginate and at least one further gelling agent, such as pectin.

In some embodiments the amorphous solid may include gelling agent comprising carrageenan.

Suitably, the amorphous solid may comprise from about 10 wt %, 15 wt %, 20 wt %, 25 wt %, 30 wt %, 35 wt % or 40% to about 75 wt %, 70 wt %, 65 wt %, 60 wt %, 55 wt % or 50 wt % of an aerosol-former material (all calculated on a dry weight basis). For example, the amorphous solid may comprise 10-70 wt %, 40-60 wt % or 50-60 wt % of an aerosol-former material.

As used herein, the aerosol-former material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate. In some cases, the aerosol-former material comprises one or more compound selected from erythritol, propylene glycol, glycerol, vegetable glycerine (VG), triacetin, sorbitol and xylitol. In some cases, the aerosol-former material comprises, consists essentially of or consists of glycerol.

In some embodiments, the amorphous solid comprises a flavor. Suitably, the amorphous solid may comprise up to about 80 wt %, 70 wt %, 60 wt %, 55 wt %, 50 wt % or 45 wt % of a flavor. In some cases, the amorphous solid may comprise at least about 0.1 wt %, 1 wt %, 10 wt %, 20 wt %, 30 wt %, 35 wt % or 40 wt % of a flavor (all calculated on a dry weight basis).

For example, the amorphous solid may comprise 1-80 wt %, 10-80 wt %, 20-70 wt %, 30-60 wt %, 35-55 wt % or 30-45 wt % of a flavor. In some cases, the flavor comprises, consists essentially of or consists of menthol.

Flavor provided in the amorphous solid material may be more stably retained within the amorphous solid material compared to flavor added directly to the plant and/or tobacco material, resulting in a more consistent flavor profile between consumables as disclosed herein.

In some cases, the amorphous solid may additionally comprise an emulsifying agent, which emulsified molten flavor during manufacture. For example, the amorphous solid may comprise from about 5 wt % to about 15 wt % of an emulsifying agent (calculated on a dry weight basis), suitably about 10 wt %. The emulsifying agent may comprise acacia gum (gum arabic) or guar gum.

In some embodiments, the amorphous solid is a hydrogel and comprises less than about 20 wt % of water calculated on a wet weight basis. In some cases, the hydrogel may comprise less than about 15 wt %, 12 wt % or 10 wt % of water calculated on a wet weight basis. In some cases, the hydrogel may comprise at least about 1 wt %, 2 wt % or at least about 5 wt % of water (WWB).

In some embodiments, the aerosol-generating material comprises a blend of at least two aerosol-generating materials. In such embodiments, the bend may comprise a first component comprising plant and/or tobacco material and a second component comprising amorphous solid material as described herein. Such aerosol-generating material can, for example, provide an aerosol, in use, with a desirable flavor profile, since additional flavor may be introduced to the aerosol-generating material by inclusion in the amorphous solid material component. As described above, tobacco material having a density of at least 350 mg/cc and less than about 700 mg/cc has been advantageously found to result in a more sustained release of aerosol. To provide an aerosol having a consistent flavor profile the amorphous solid material component of the aerosol-generating material should be evenly distributed throughout the rod. This can be achieved by casting the amorphous solid material to have an area density which is similar to the area density of the plant and/or tobacco material, and processing the amorphous solid material to ensure an even distribution throughout the aerosol-generating material.

For the avoidance of doubt, where reference is made herein to area density, this refers to an average area density calculated for a given strip, piece or sheet of aerosol-generating material with combustion retarding salt coating, the area density calculated by measuring the surface area and weight of the given strip, piece or sheet of aerosol-generating material.

In some embodiments, even mixing of the plant and/or tobacco material component and the amorphous solid material component can be achieved when the amorphous solid material in sheet form is shredded. Preferably the cut width of the shredded amorphous solid material is between 0.75 mm and 2 mm, for instance between 1 mm and 1.5 mm. The strands of amorphous solid material formed by shredding may be cut width-wise, for example in a cross-cut type shredding process, to define a cut length for the shredded amorphous solid material, in addition to a cut width. The cut length of the shredded amorphous solid material is preferably at least 5 mm, for instance at least 10 mm, or at least 20 mm. The cut length of the shredded amorphous solid material can be less than 60 mm, less than 50 mm, or less than 40 mm. In some embodiments, to achieve even mixing of the shredded amorphous solid material with cut rag tobacco, the cut length of the shredded amorphous solid material is preferably non-uniform. Although referred to as cut length, the length of the shreds or strips of amorphous solid material can alternatively or additionally be dictated by a dimension of the material determined during its manufacture, for instance the width of a sheet of the material as manufactured.

In exemplary embodiments, the aerosol-generating material comprises a first component comprising a plant and/or tobacco material in an amount from 50% to 98%, for instance from 80% to 95%, wherein the tobacco material is for instance provided as a cut rag tobacco, and a second component comprising shredded amorphous solid material in an amount from 2% to 50%, for instance from 5% to 20%.

In some embodiments of invention in which the aerosol-generating material is in sheet form may have any suitable area density, such as from about 30 g/m² to about 150 g/m². In some cases, the sheet may have a mass per unit area of about 55 g/m² to about 135 g/m², or about 80 to about 120 g/m², or from about 70 to about 110 g/m², or particularly from about 90 to about 110 g/m², or suitably about 100 g/m². Such area densities may be particularly suitable where the aerosol-generating material with combustion retarding properties is included in an aerosol-generating article as a shredded sheet (described further herein). In some cases, the sheet may have a mass per unit area of about 30 to 70 g/m², 40 to 60 g/m², or 25 to 60 g/m².

The density of the combustion retarding salt coating has an impact on the speed at which heat conducts through the aerosol-generating material, with lower densities, for instance those below 700 mg/cc, conducting heat more slowly through the material, and therefore enabling a more sustained release of aerosol. The density of the combustion retarding salt also has an impact on the speed of heat conductions, as well as the aforementioned combustibility of the consumable.

In some examples, the material is in sheet form and may have a tensile strength of from around 200 N/m to around 900 N/m. In some examples, such as where the material does not comprise a filler, the material may have a tensile strength of from 200 N/m to 400 N/m, or 200 N/m to 300 N/m, or about 250 N/m. Such tensile strengths may be particularly suitable for embodiments wherein aerosol-generating material is formed as a sheet and then shredded and incorporated into the consumable.

Addition of Combustion Retarding Salt to Aerosol-Generating Material

In some embodiments, aerosol-generating material, such as tobacco material, is mixed with a solution comprising the combustion retarding salt. In some embodiments, the aerosol-generating material is sprayed with a solution or carrier liquid comprising the combustion retarding salt. This technique may be used to form an external coating at least partially covering the aerosol-generating material.

In some embodiments, the aerosol-generating material is moved, for example in a rotating drum or conveyor belt, whilst being sprayed with the solution or carrier liquid comprising the combustion retarding salt to achieve an even coating. This advantageously distributes the combustion retarding salt over the aerosol-generating material. The distribution of the combustion retarding salt may be even across the aerosol-generating material. This technique may be repeated one or more times to form one or more layers of the combustion retarding salt. This technique may also be repeated one or more times with one or more combustion retarding salts to apply one or more combustion retarding salts to the aerosol-generating material. Advantageously, different combustion retarding salts may be incorporated in the coating or the aerosol-generating material. This may provide a specific combustion-retarding profile.

In an exemplary embodiment in which the aerosol-generating material comprises tobacco material, a liquid carrier comprising the combustion retarding salt is sprayed onto the tobacco material in part of the conventional processing of the tobacco material. Typically, the tobacco material is treated, blended and cut in to "rag" in order to achieve a homogenous blend for packing into a consumable. An example apparatus to perform the conditioning treatment is known as the direct casing conditioning cylinder, which can be used to apply substances to the tobacco material. In a preferred embodiment of the invention, the carrier liquid comprising the combustion retarding salt is sprayed onto the tobacco material using this apparatus. This is advantageous because the combustion retarding salt, flavoring, humectants and other additives disclosed herein may be added in one step. An additional advantage is that the addition of salts at other steps in the manufacture of the aerosol-generating material may cause corrosion of the machinery involved. Advantageously, there is only one drying step required, and this reduces the loss of volatiles associated with repeated drying of the tobacco material, and therefore maintaining content nicotine, flavors and other volatiles which are desirable for inhalation by the end user.

In a further exemplary embodiment in which the aerosol-generating material comprises a reconstituted material such as reconstituted tobacco, the salt is included in a concentrated liquid extract which is added to the solid extract to add flavors and other soluble components. This concentrated liquid extract with salt may be sprayed onto the reconstituted material. Alternatively, in other embodiments, the reconstituted material may be dipped or soaked in the extract including the salt. These embodiments incorporate the application of the salt into the production of the reconstituted material rather than adding a separate, additional step and therefore avoid the need for an additional drying step or the like.

In some embodiments, the aerosol-generating material is injected with a solution or carrier liquid comprising the combustion retarding salt. The aerosol-generating material may be injected during the preparation of the consumable, or alternatively after assembly of the consumable. This advantageously distributes the combustion retarding salt over the aerosol-generating material. The distribution of the combustion retarding salt may be even across the aerosol-generating material, or the injection process may advantageously provide an uneven distribution of the combustion retarding salt across the aerosol-generating material. This technique may be repeated one or more times to form one or more layers of the combustion retarding salt. This technique may also be repeated one or more times with one or more combustion retarding salts to apply one or more combustion retarding salts to the aerosol-generating material. Advantageously, different combustion retarding salts may be incorporated in the coating or the aerosol-generating material. This may provide a specific combustion-retarding profile. This process enjoys the benefit that specific locations on the aerosol-generating material may be targeted to have the combustion retarding salt applied. For example, the aerosol-generating material located in the distal portion of the consumable may be coated with the aerosol-generating material.

In some embodiments, the combustion retarding salt coating may comprise of additional components, which are described herein. In some embodiments, in which the combustion retarding salt is a coating on the aerosol-generating material, the additional components are also distributed on the surface of the aerosol-generating material. In some embodiments, the additives are added to the aerosol-generating material at a different stage to the addition of the combustion retarding salt. In some embodiments, the additives are added to the aerosol-generating material at the same stage to the addition of the combustion retarding salt.

In some cases, the aerosol-generating material may consist essentially of, or consist of a combustion retarding salt, a humectant and tobacco material.

In some embodiments, the aerosol-generating material may optionally further comprise a flavor, a binder and/or an active substance.

The aerosol-generating material may comprise one or more combustion retarding salts, one or more active substances and/or flavors, one or more aerosol-former materials, and optionally one or more other functional material.

Consumables

A consumable is an article comprising aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent.

A consumable may also comprise an aerosol generator, such as a heater, that emits heat to cause the aerosol-generating material to generate aerosol in use. The heater may, for example, comprise combustible material, a material heatable by electrical conduction, or a susceptor. The consumable may be any shape or size that is appropriate to the smoking device. In a preferred embodiment of the invention, the consumable is a rod shape.

In the present invention, the consumable comprises the material with combustion retarding properties comprising a combustion retarding salt and an aerosol-generating material as disclosed herein.

In some embodiments, the consumables are intended for use in a non-combustible aerosol provision system. In some territories, it is necessary for such consumables to resist combustion and this may be enhanced by inclusion of the material with combustion retarding properties.

In some embodiments, the inclusion of the material with combustion retarding properties in the consumable means that it is not necessary to include a foil in the consumable. Consumables can include a metal foil, such as aluminium foil, as part of the wrapper surrounding the aerosol-generating material to retard or prevent combustion.

In some embodiments, the consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

In some embodiments, the substance to be delivered may be an aerosol-generating material or a material that is not intended to be aerosolized. As appropriate, either material may comprise one or more active constituents, one or more flavors, one or more aerosol-former materials, and/or one or more other functional materials.

The aerosol-generating material may be present on or in a support, to form a substrate. The support may, for example, be or comprise paper, card, paperboard, cardboard, reconstituted material, a plastics material, a ceramic material, a composite material, glass, a metal, or a metal alloy. In some embodiments, the support comprises a susceptor. In some embodiments, the susceptor is embedded within the material. In some alternative embodiments, the susceptor is on one or either side of the material.

The aerosol-generating material with combustion-retarding properties can be incorporated into a consumable of a non-combustible aerosol provision system in any way.

In some embodiments, the consumable further comprises a wrapper. The wrapper may be an external covering, a packaging material or a coating over the aerosol-generating material.

In some embodiments in which the consumable comprises a wrapper, said wrapper may have a plurality of vents and/or perforations. This increases the ventilation in the rod, can enhance the user's experience of the flavor properties of the aerosol-generating material and provide the appropriate pressure drop for ease of use. The location of these vents and/or perforations may be between about 0.5 mm to about 10 mm, between about 1 mm to about 4 mm or between about 4 mm to about 8 mm from the distal end of the rod. The vents and/or perforations may be of any suitable size and/or number. The size, number and location on the wrapper of the vents and/or perforations may be selected to provide the appropriate flow through of air. For example, more numerous and larger vents and/or perforations may introduce more air into the rod, increase the flow-through of air and thus provide the appropriate pressure drop.

The wrapper may comprise or consist substantially of paper or a paper-like material. Said paper or paper-like material may be between about 20 gsm and about 90 gsm, between about 25 gsm and about 35 gsm, or between about 55 gsm and 65 gsm. The inventors have found that thicker papers perform better in this invention.

The aerosol-generating material with combustion retarding salt coating may be provided in sheet form, a monolithic form, as particles or be arranged as a shredded material.

In embodiments described herein, the aerosol-generating material may be incorporated into the article in sheet form. The material in sheet form may be shredded and then incorporated into the article.

In further embodiments the sheet may additionally be incorporated as a planar sheet, as a gathered or bunched sheet, as a crimped sheet, or as a rolled sheet (i.e. in the form of a tube). In some such cases, the plant and/or tobacco material in these embodiments may be included in an aerosol-generating article as a sheet, such as a sheet circumscribing a rod of aerosol-generating material (e.g. tobacco material).

FIG. 1 is a side-on cross sectional view of a consumable or article 1 for use in an aerosol delivery system. The article 1 comprises a mouthpiece segment 2, and an aerosol generating segment 3.

The aerosol generating segment 3 is in the form of a cylindrical rod and comprises an aerosol-generating material 4 comprising cut rag reconstituted tobacco and combustion retarding salt. The aerosol-generating material can be any of the materials discussed herein.

Although described above in rod form, the aerosol-generating segment 3 can be provided in other forms, for instance a plug, pouch, or packet of material within an article.

The mouthpiece segment 2, in the illustrated embodiment, includes a body of material 5 such as a fibrous or filamentary tow.

The rod-shaped consumable 1 further comprises a wrapper 6 circumscribing the mouthpiece segment 2 and aerosol generating segment 3, such as a paper wrapper.

Non-Combustible Aerosol Provision Systems

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the delivery system is a non-combustible aerosol provision system, such as a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energized so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

FIG. 2 shows an example of a non-combustible aerosol provision device 100 for generating aerosol from an aerosol-generating medium/material such as the aerosol-generating material of a consumable 110, as described herein. In broad outline, the device 100 may be used to heat a replaceable article 110 comprising the aerosol-generating medium, for instance an article 1 as illustrated in FIG. 1 or as described elsewhere herein, to generate an aerosol or other inhalable medium which is inhaled by a user of the device 100. The device 100 and replaceable article 110 together form a system.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 2, the lid 108 is shown in an open configuration, however the lid 108 may move into a closed configuration. For example, a user may cause the lid 108 to slide in the direction of arrow "B".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

EXAMPLES

Tests were conducted to demonstrate that the addition of a combustion retarding salt, namely sodium chloride, to an aerosol-generating material, namely cut paper reconstituted tobacco, afforded the aerosol-generating material combustion retardancy.

In a first test, 35 g of sodium chloride was dissolved in 100 ml of water. This produced a solution comprising 0.27 g of sodium chloride per 1 g of solution. 16.7 g of this solution was sprayed onto 2.6 g of cut rag on a tray. The sprayed cut rag was then dried and the weight of the cut rag plus sodium chloride was calculated to be 7.5 g. Thus, 4.9 g of sodium chloride has been added to the cut rag, producing a ratio of cut rag tobacco to sodium chloride in the treated material of 1:1.88.

Consumables were then made up with a paper wrapper surrounding the salt-treated tobacco. For testing, the consumables were lit in the manner of a combustible cigarette and attempts were made to smoke them by puffing. The consumables were also tested in a standard device for combustion. The greater the combustion resistance of the salt-treated tobacco, the less of the consumable was combusted. Tests showed that the cut rag tobacco produced as described above resisted combustion well.

The consumables were defined as 'non-smokeable' under the testing regime of 55 ml puffs for a duration of 2 seconds every 30 seconds for 10 puffs, as only the lighting puff was achieved before the consumable self-extinguished.

In a further test, 35 g of sodium chloride was once again dissolved in 100 ml of water. 9.5 g of this solution was sprayed onto 2.4 g of cut rag on a tray. The sprayed cut rag was then dried and the weight of the cut rag plus sodium chloride was calculated to be 5.0 g. Thus, 2.6 g of sodium chloride had been added to the cut rag, producing a ratio of cut rag tobacco to sodium chloride in the treated material of 1:1.08.

This salt-treated tobacco material was then tested as described above and it was again noted that it resisted combustion well.

In a further test, 3 g of sodium chloride was dissolved in 10 mL of distilled water to make a 23% salt solution. To a rod-shaped consumable comprising tobacco, 30 µL of this solution was injected into the distal end of the rod and dried in a foil bag. The consumable was resistant to attempted combustion at the distal end. This was repeated five times with the same result for each prepared rod. The rods were then kept in foil sealed bags for two weeks with continuous movement, to simulate transportation. Again, all five rod resisted combustion when this was attempted at the distal end of the rods.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A material with combustion retarding properties comprising a combustion retarding salt and an aerosol-generating material, wherein the material comprises at least about 30% by weight of the combustion retarding salt (dry weight basis).

2. The material as claimed in claim 1, wherein the combustion retarding salt is a metal halide salt, optionally selected from the group consisting of: sodium chloride, potassium chloride, sodium bromide, potassium bromide, and combinations thereof.

3. The material as claimed in claim 1, wherein the combustion retarding salt is applied to the aerosol-generating material.

4. The material as claimed in claim 1, wherein the combustion retarding salt at least partially coats the aerosol-generating material.

5. The material as claimed in claim 1, wherein the material comprises from about 3 wt % to about 200 wt % of the combustion retarding salt (based on a weight of the aerosol-generating material and on a dry weight basis).

6. The material as claimed in claim 1, wherein the aerosol-generating material comprises tobacco material.

7. The material as claimed in claim 6, wherein the tobacco material is cut rag tobacco or reconstituted tobacco.

8. A consumable comprising the material with combustion retarding properties as claimed in claim 1.

9. The consumable as claimed in claim 8, wherein the consumable is rod shaped.

10. The consumable as claimed in claim 9, wherein the consumable has a distal end and a proximal end and wherein the material is provided exclusively or in greater concentration at a location proximal to the distal end of the consumable.

11. A non-combustible aerosol provision system comprising the consumable as claimed in claim 8.

12. A method for manufacturing the material as claimed in claim 1, incorporating the combustion retarding salt into the aerosol-generating material or adding the combustion retarding salt to the aerosol-generating material.

13. The method as claimed in claim 12, wherein a solution or a suspension comprising the combustion retarding salt is applied to the aerosol-generating material.

14. The method as claimed in claim 12, wherein the combustion retarding salt is added during manufacture of the aerosol-generating material.

15. The method as claimed in claim 12, wherein a tobacco material is mixed with a solution comprising the combustion retarding salt.

16. The material as claimed in claim 1, wherein the combustion retarding salt prevents combustion from external ignition.

17. A method of providing a combustion retarding salt for retarding the combustion of an aerosol-generating material in a consumable for a non-combustible aerosol provision system, the method comprising:
applying a combustion retarding salt to the aerosol-generating material to form a material comprising at least about 30% by weight of the combustion retarding salt (dry weight basis).

* * * * *